US009575175B2

(12) United States Patent
Grooters et al.

(10) Patent No.: US 9,575,175 B2
(45) Date of Patent: Feb. 21, 2017

(54) SYSTEM FOR PROTECTING AN AIRBORNE PLATFORM AGAINST COLLISIONS

(71) Applicants: Reindert Grooters, Amsterdam (NL); Arnoldus Petrus Maria Maas, The Hague (NL); Pascal Olive, Toulouse (FR); Sébastien Mazuel, Toulouse (FR); Didier Marchetti, Ramonville Saint Agne (FR); Eric Itcia, Toulouse (FR)

(72) Inventors: Reindert Grooters, Amsterdam (NL); Arnoldus Petrus Maria Maas, The Hague (NL); Pascal Olive, Toulouse (FR); Sébastien Mazuel, Toulouse (FR); Didier Marchetti, Ramonville Saint Agne (FR); Eric Itcia, Toulouse (FR)

(73) Assignees: Rockwell Collins France, Blagnac (FR); Nederlandse Organisatic Voor Toegepast-Natuurwetenschappelijk Onderzock TNO, Delft (NL)

( * ) Notice: Subject to any disclaimer, the term of this patent is extended or adjusted under 35 U.S.C. 154(b) by 464 days.

(21) Appl. No.: 14/011,407

(22) Filed: Aug. 27, 2013

(65) Prior Publication Data
US 2014/0062753 A1 Mar. 6, 2014

(30) Foreign Application Priority Data

Aug. 28, 2012 (FR) ...................................... 12 58025

(51) Int. Cl.
*G01S 13/93* (2006.01)
*G01S 7/02* (2006.01)
(Continued)

(52) U.S. Cl.
CPC .......... *G01S 13/9303* (2013.01); *G01S 7/023* (2013.01); *G01S 7/4008* (2013.01); *G01S 13/345* (2013.01); *G01S 2007/4039* (2013.01)

(58) Field of Classification Search
CPC ....... G01S 13/9303; G01S 13/94; G01S 7/023
(Continued)

(56) References Cited

U.S. PATENT DOCUMENTS 5,371,581 A * 12/1994 Wangler .................... G01S 7/51
340/946
5,525,996 A 6/1996 Aker et al.
(Continued)

FOREIGN PATENT DOCUMENTS

| EP | 2 180 336 A2 | 4/2010 |
| EP | 2 442 133 A1 | 4/2012 |
| EP | 2 463 684 A1 | 6/2012 |

OTHER PUBLICATIONS

European Search Report for Application No. FR 1258025, mail date Jun. 25, 2013, 2 pages.

*Primary Examiner* — Marcus Windrich
(74) *Attorney, Agent, or Firm* — Foley & Lardner LLP (57) ABSTRACT

Systems and methods for protecting an airborne platform against collisions are provided. One system includes FMCW radar sensors including transmitting antennae, means for receiving signals from echoes and for processing and digitizing same, and means for sending a central unit data representing said digital signals via a dedicated point to point link. The central unit includes means for processing said data to detect obstacles, means for calculating parameters for each obstacle including its radial velocity, distance range and azimuth, and means to transmit an avionic system of said platform data representing said detected obstacles and parameters. The system further includes means for guaranteeing that said emitted signals are shifted in time to (Continued)

create a shift in frequency guaranteeing that the radar sensors operate in the whole frequency band without perturbing each other.

15 Claims, 6 Drawing Sheets

(51) Int. Cl.
  *G01S 7/40* (2006.01)
  *G01S 13/34* (2006.01)
(58) Field of Classification Search
  USPC .................................. 342/29, 59, 107, 140
  See application file for complete search history.

(56) References Cited

U.S. PATENT DOCUMENTS

| | | | | |
|---|---|---|---|---|
| 6,069,581 | A * | 5/2000 | Bell ..................... | B60Q 1/0023 342/70 |
| 6,278,409 | B1 * | 8/2001 | Zuta ..................... | G01S 7/025 342/188 |
| 7,259,714 | B1 * | 8/2007 | Cataldo ................. | G01S 13/22 342/104 |
| 7,598,888 | B2 * | 10/2009 | Matuska ................ | G01O 5/005 340/945 |
| 2003/0025629 | A1 * | 2/2003 | Barrick .................. | G01S 7/02 342/59 |
| 2009/0135049 | A1 * | 5/2009 | Kikuchi ................. | B60W 30/17 342/70 |
| 2010/0097263 | A1 * | 4/2010 | Vacanti .................. | G01S 7/023 342/70 |
| 2010/0299067 | A1 * | 11/2010 | McCollough ........... | G08G 5/04 701/301 |
| 2011/0133979 | A1 * | 6/2011 | Huizing .................. | G01S 7/414 342/29 |
| 2012/0029738 | A1 * | 2/2012 | Brunetti ................. | G08G 5/0078 701/11 |
| 2012/0092208 | A1 * | 4/2012 | LeMire ................... | G01S 13/87 342/29 |
| 2012/0146837 | A1 * | 6/2012 | Vacanti .................. | G01S 7/4008 342/120 |
| 2012/0154203 | A1 * | 6/2012 | Vacanti .................. | G01S 7/03 342/149 |
| 2012/0177045 | A1 * | 7/2012 | Berman ................. | H04L 12/4633 370/392 |
| 2012/0229325 | A1 * | 9/2012 | Dutruc ................... | G01S 7/03 342/29 |

* cited by examiner

SYSTEM FOR PROTECTING AN AIRBORNE PLATFORM AGAINST COLLISIONS

CROSS-REFERENCE TO RELATED PATENT APPLICATIONS

This application claims the benefit of and priority to French Patent Application No. 1258025, filed Aug. 28, 2012, which is hereby incorporated herein in its entirety.

BACKGROUND

The present disclosure belongs to the area of protecting an airborne platform against collision.

The disclosure is more particularly aiming at detecting short range obstacles over a wide field of view. This field of view may cover at least 180° horizontally in order to survey the rear part of the platform which is not observable by the pilot, if the airborne platform is piloted. This field of view will encompass parts of the fuselage of the airborne platform.

The whole field of view has to be surveyed continuously, and not sequentially, in order to minimize the warning time and hence allow sufficient reaction time for the pilot.

In operational scenarios of the disclosure, the airborne platform is stationary or moving at very low speed. Consequently, the obstacles to be detected are located at close range, at the order of magnitude of the airborne platform dimension.

In order to avoid a high false alarm rate which would consequently have the system rejected by the pilot community, the detected obstacles have to be localized with high accuracy.

State of the art radars for obstacle detection have been developed in the automotive domain.

The wide field of view requirement is fulfilled by using several sensors, covering segments of the whole field of view. The sensors are arranged so that a given sensor never receives echoes of signals emitted by another sensor which are reflected by the automotive platform itself.

This is no longer the case for an airborne platform where moving parts of the fuselage, such as rotor blades of a helicopter platform, will be permanently in view of sensors, creating spurious signals generated by one sensor transmitter and reflected into the other sensor receiver.

The range accuracy requirement is fulfilled by the use of Ultra Wide Band frequency of operation. Moreover, Ultra Wide Band frequency allows shifting in frequency automotive sensors, as proposed in document EP 2 180 336 A2, so that two sensors located in close proximity do not interfere with each other, while maintaining sufficient bandwidth for each sensor in order to fulfill the range accuracy requirement.

Shifting sensors in frequency, i.e. operating at different frequency ranges (sub-band) in the same bandwidth, as proposed in document EP 2 180 336 A2 is no longer possible in airborne domain where the use of Ultra Wide Band frequency is strictly prohibited by frequency regulation authorities. Airborne sensors have to conform to ITU regulations where the authorized bandwidth, especially for airborne application, is relatively narrow so that each sensor has to use the whole frequency band in order to provide the accuracy required by the collision avoidance application at low speed.

Having the sensors operating sequentially in time degrades the detection refresh rate over the whole field of view and do not allow sufficient warning time for the pilot to avoid the collision.

The frequency used in automotive sensors is high, so that high directionality is achieved with small sensors. This helps to prevent interference between sensors, and allows easy azimuth direction estimation.

This is no longer the case in airborne sensors as the available frequency band is much lower, so that small sensors will have a wide radiated beam.

One object of the disclosure is to overcome these limitations.

SUMMARY

One embodiment of the disclosure relates to a protecting system for protecting an airborne against collisions with obstacles. The system includes:
at least one central unit;
at least two identical FMCW radar sensors on the surface of said airborne platform and designed to operate in the entirety of a same frequency band, each said FMCW radar sensor being connected to said central unit via a first dedicated point to point link, and comprising:
at least one transmitting antenna for transmitting a FMCW signal;
at least two receiving channels, each channel comprising a receiving antenna for generating a received signal from the echoes reflected by at least one of said obstacles, and means for demodulating, filtering and digitizing said received signal into a digital signal, said receiving antennae being arranged to allow the measurement of at least the azimuth of said at least one obstacle; and
sending means for sending said central unit data representing said digital signals via said first dedicated point to point link;
said at least one central unit comprising:
receiving means for receiving via each said first dedicated point to point link, said data sent by each said FMCW radar sensor;
processing means for processing said data to detect said obstacles in the field of view of said FMCW radar sensors; and
calculating means for calculating parameters for each said detected obstacle, said parameters comprising at least the radial velocity, the distance range and the azimuth range of said obstacle;
transmitting means to transmit an avionic system of said airborne platform data representing said detected obstacles and their said parameters; and
synchronizing means for guaranteeing that said FMCW signals emitted by said transmitting antennae are shifted in time to create a shift in frequency which is sufficient to guarantee that each said FMCW radar sensor operates in the entirety of said frequency band without being perturbed by its neighboring FMCW radar sensors.

BRIEF DESCRIPTION OF THE DRAWINGS

Other features and advantages of the present disclosure emerge from the description given below with reference to the appended drawings, which show one non-limiting implementation of the present disclosure. In the figures.

DETAILED DESCRIPTION

The disclosure concerns a protecting system for protecting an airborne platform against collisions with obstacles.

In some embodiments, the disclosure proposes to use a plurality of FMCW radar sensors that all together cover a wide field of view possibly encompassing the whole platform if required by the application.

In some embodiments, a system of the disclosure may be remarkable in that all the FMCW radar sensors are identical, which is effective both from a cost and from a maintenance perspective.

Remarkably, the system may provide synchronizing means aiming to guarantee that each FMCW radar sensor operates in the entirety of the said frequency band without being perturbed by its neighboring FMCW radar sensors.

Synchronizing identical sensors shifted in time, each of them operating in the same bandwidth advantageously provides an optimum use of the said frequency band, and consequently an optimum range resolution.

Besides, according to exemplary embodiments of the disclosure, each sensor may be connected via a point to point dedicated link to the central unit. This dedicated point to point star topology guarantees a very predictable transmission channel between the sensors and the central unit. The first consequence is that data channels and synchronization signals are perfectly deterministic, i.e. there is no unpredictable latency in the transmission. The second consequence is that the skew between the different synchronization signals is minimized. These two effects allow shifting sensors in time with the required accuracy. It also permits to achieve low cost sensors, most of the processing being performed by the central unit.

In a particular embodiment, the FMCW radar sensors comprise a GPS receiver to synchronize themselves using the GPS clock.

In a particular embodiment, the above mentioned synchronizing means comprise:
  means of said central unit for simultaneously sending a synchronization signal to each of said FMCW radar sensors; and
  means of said FMCW radar sensors to determine a delay to wait for before starting transmitting said FMCW signal after reception of said synchronizing signal.

This solution may be easy to implement, and the protocol between the central unit and the FMCW radar sensors may be limited to the sending of the synchronization signal.

Different solutions may be envisaged for the radar sensors to determine the above mentioned delay. For example, each sensor may determine this delay based on the broaching of the cable connector it is connected to, each connector having a unique broaching.

In a particular embodiment, the central unit sends the synchronization signal to the FMCW radar sensors via a second point to point dedicated link different from said first dedicated point to point link, each said second point to point dedicated link being a differential line using a current loop.

This embodiment enables the delivery of the synchronization signal with very high accuracy.

In a particular embodiment, the protection system of the disclosure further includes:
  evaluating means to evaluate a dangerousness of said detected obstacles from said parameters; and
  classifying means to classify said detected obstacles according to their dangerousness.

This embodiment may be used to provide the avionics system with specific information or alerts according to the dangerousness of the detected obstacles. For example, in case of emergency, the airborne platform may automatically undertake a maneuver to avoid the collision.

In a particular embodiment, the first dedicated point to point link is an Ethernet full duplex link, the data representing the digital signals generated by the receiving antennae being encapsulated into Ethernet frames. This solution is easy to implement and cost effective. It also allows the use of long wirings from the central unit to the sensors.

In a particular embodiment, at least one central unit further comprises filtering means to filter the received signals due to echoes reflected by the envelope of the airborne platform according to at least one of said parameters of obstacles representing said envelope.

This solution improves considerably the detection of the obstacles when parts of the envelope of the airborne platform are in the field of view of the sensors. For example, the filtering means may be adapted to cancel echoes from the blades, based on their specific distance, when the disclosure is implemented on a helicopter.

In a particular embodiment, the receiving antennae are arranged in the sensor units to further allow the measurement of the elevation of the obstacles, the computed parameters of a detected obstacle also comprising its elevation. This solution provides the possibility to angularly locate the detected obstacles in both azimuth and elevation.

In a particular embodiment, at least one central unit further comprises merging means to merge the obstacles detected by at least two different FMCW radar sensors.

Sensor units are placed outside of the airborne platform, hence they are exposed to harsh environmental constraints, such as low and high temperatures, especially when close to engines. In a particular embodiment, at least one FMCW radar sensor further comprises means to deactivate itself if the temperature in the sensor goes above a determined threshold.

This solution allows using non ruggedized electronic components within the sensors, while avoiding excessive heat which causes erroneous signals to be provided to the central unit, which could in turn generate erroneous alerts.

In a particular embodiment, the processing means of the central unit take into account at least one flight parameter to detect the obstacles. For example, the altitude of the platform may be taken into account to improve the clutter detection. Besides, the speed vector of the platform may be considered in the determination of the dangerousness of the detected obstacles.

In a particular embodiment, the system includes means to detect that at least one FMCW radar sensor is obstructed, e.g., by ice. This solution allows detecting a malfunction of the system.

In a particular embodiment, at least one said FMCW radar sensor is powered from the central unit. The power may preferably be provided through a dedicated line, to comply specific ECM requirements.

In a particular embodiment, the central unit includes means to send at least one of said FMCW radar sensor a command to deactivate the transmitting of said sensor. This solution notably advantageously applies when other radar or sensors are used on the platform. The operation of the FMCW radar sensors of the disclosure may resume very rapidly since only the radio components are deactivated.

The command may be sent via the first point to point dedicated link or not.

In a particular embodiment, the antennae of the protecting system are patch antennae, offering a light and robust solution.

Figure 1:
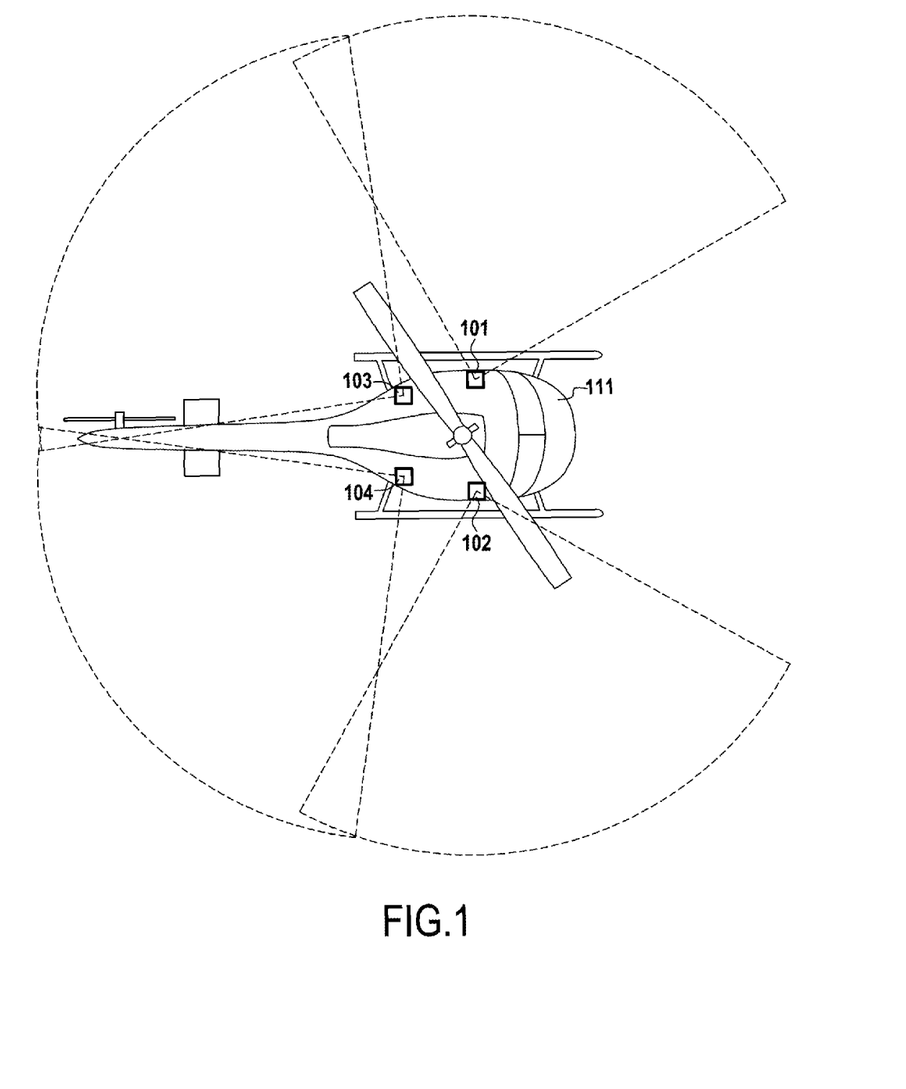
FIG. 1 represents an example of an airborne platform with four FMCW radar sensors on its surface.

FIG. 1 represents an airborne platform 111 (a helicopter) with four identical FMCW radar sensors 101 to 104 on the surface of the airborne platform.

Figure 2:
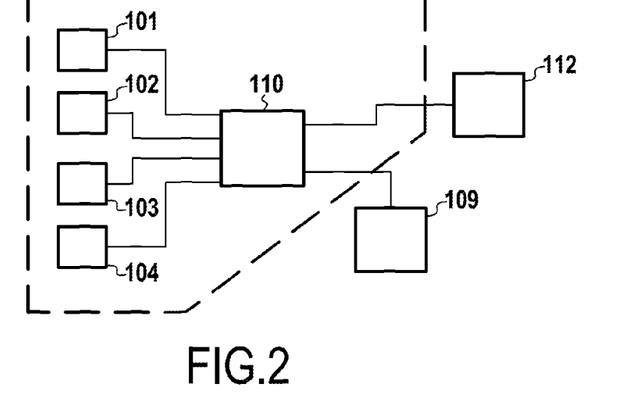
FIG. 2 represents a block diagram of a protecting system in accordance with a particular embodiment of the disclosure.

FIG. 2 represents a protecting system 100 for protecting the airborne platform of FIG. 1 against collisions with obstacles in accordance with a particular mode of implementation of the disclosure.

The protecting system 100 includes:
one central unit 110; and
four identical FMCW radar sensors 101~104, out of the eight that central unit 110 can support.

In this implementation, each radar sensor 101~104 is connected to the central unit 110 with a sheath comprising a power supply link PWRi, a differential RS422 link SYNCi, an Ethernet link ETHi and a discrete link MISi, as detailed below in reference to FIGS. 2 and 3.

In fact, in the implementation described here, the central unit 110 powers each FMCW radar sensor 101~104 through the above mentioned dedicated power supply link.

The central unit 110 possesses transmitting means for transmitting to the avionics system of the airborne platform 111, data representing the detected obstacles and their parameters (radial velocity, distance range, azimuth range, . . . ).

In this particular mode of implementation, the avionics system is a dedicated human-machine interface HMI 109, connected to the central unit over a display and audio interface.

In an alternate implementation, the avionics system is an Integrated Modular Avionics (IMA) 112, connected to the central unit over an ARINC 429 interface.

Figure 4A:
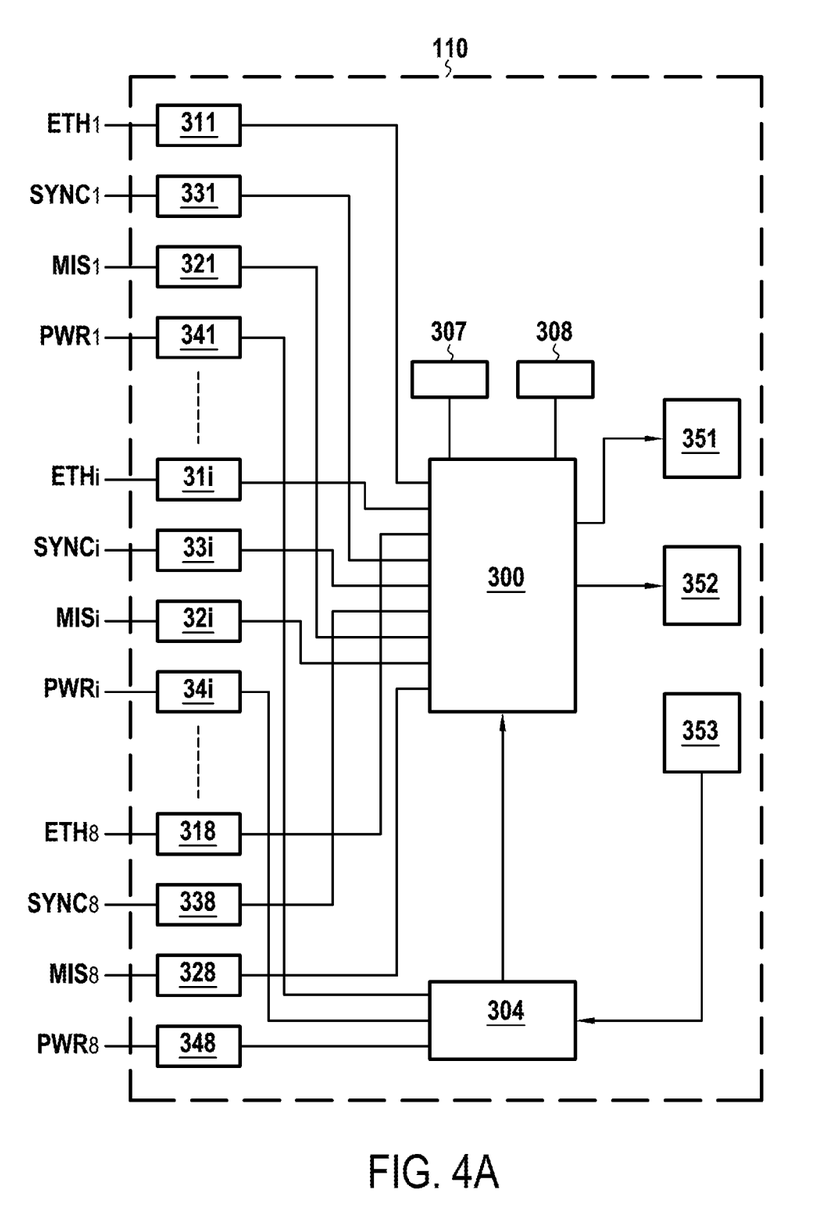
FIG. 4A represents a block diagram of a central unit of the protecting system of FIG. 2.

As shown in FIG. 4A, the central unit 110 receives its power from the airborne platform 111 power supply through a power supply interface 353, where it is protected and filtered according to the airborne platform power supply's characteristics. An internal power unit 304 generates secondary power supplies from said filtered power supply. In particular, the internal power unit 304 provides the power supply to up to eight sensors 101~108 through the interfaces 341 to 348. This allows providing a protected and filtered power supply towards each sensor, avoiding extra electronic components and associated cost within the sensor.

Figure 7:
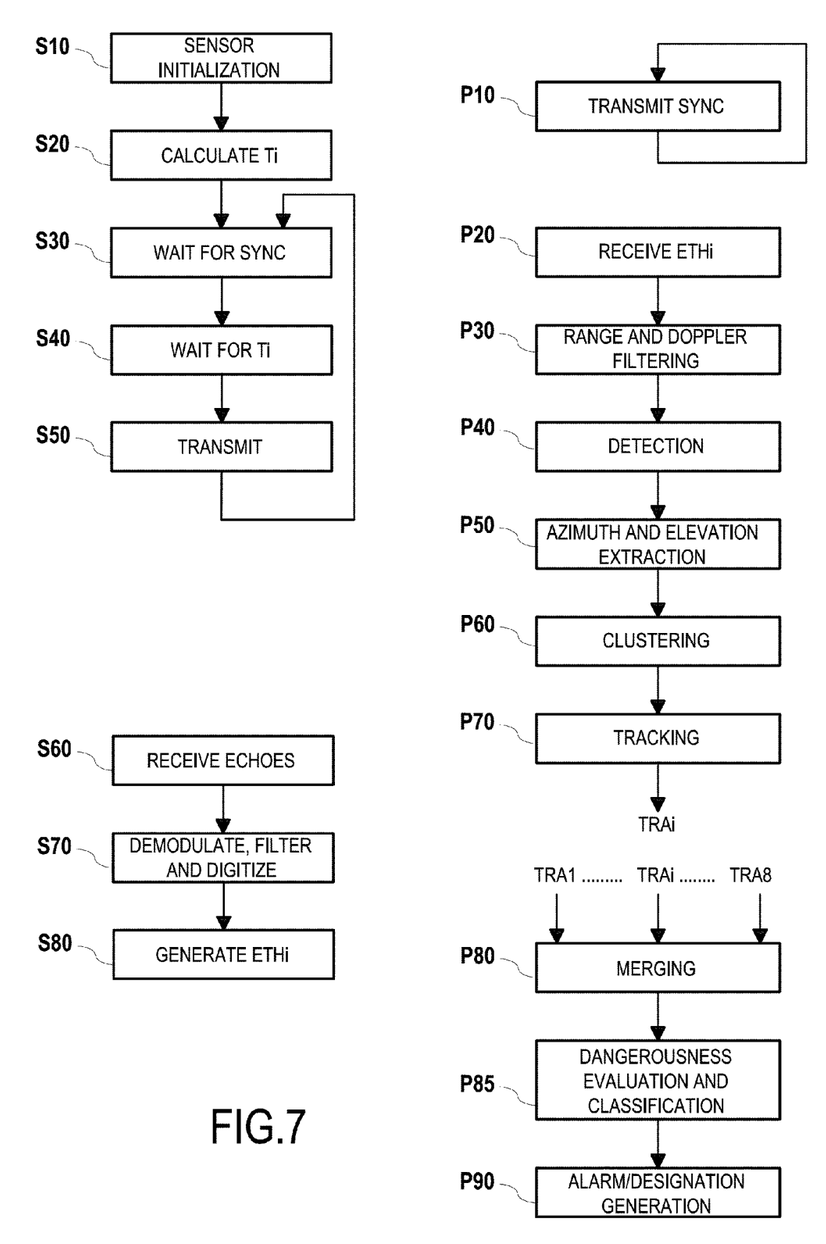
FIG. 7 represents in flowchart form the main steps of one particular embodiment of a detection method of the disclosure.

FIG. 7 represents in flowchart form the main steps of one particular embodiment of a detection method of the disclosure. More particularly:

each sensor unit of the protecting system implements a first process of steps S10 to S50 and a second process of steps S60 to S80;
the central unit implements a first process of steps P10 to P70 and a second process of steps P80 to P90.

In the implementation described here, each FMCW radar sensor of the protecting system determines at step S10, a unique index number depending on the value of some of its inputs (MISi). These inputs are set by the broaching of the mating connector terminating the above mentioned sheath, each said connector of each radar sensor sheath having a unique broaching. This is a pin-programming mechanism, well known by the man skilled in the art. Each FMCW radar sensor then stores this value in its volatile memory 208. In this step S10, each FMCW radar sensor also acquires a ΔT delay unit, provided by the central unit. ΔT is a constant common to the whole protecting system.

In the implementation described here, the logic 200 of each FMCW radar sensor of the protecting system determines at step S20, a delay Ti corresponding to said unique index number, according to the following formula: Ti=i*ΔT, where i is the index number of the sensor SUi, and ΔT is the said delay unit.

In the implementation described here, each FMCW radar sensor 10i of the protecting system then waits at step S30 for a rising edge on its SYNCi input.

In the implementation described here, the logic 300 within the central unit 110 generates, at step P10, a pulse on a synchronization signal SYNC at periodic time intervals, and sends this synchronization signal simultaneously to each FMCW radar sensor unit, through their above mentioned dedicated SYNCi differential RS422 links.

In the implementation described here, when FMCW radar sensor unit 10i of the protecting system receives the synchronization pulse, it waits during the time Ti at a step S40 before transmitting its FMCW signal at a step S50. When the transmission is completed, it then returns to step S30, and waits for the next SYNC pulse.

Figure 5:
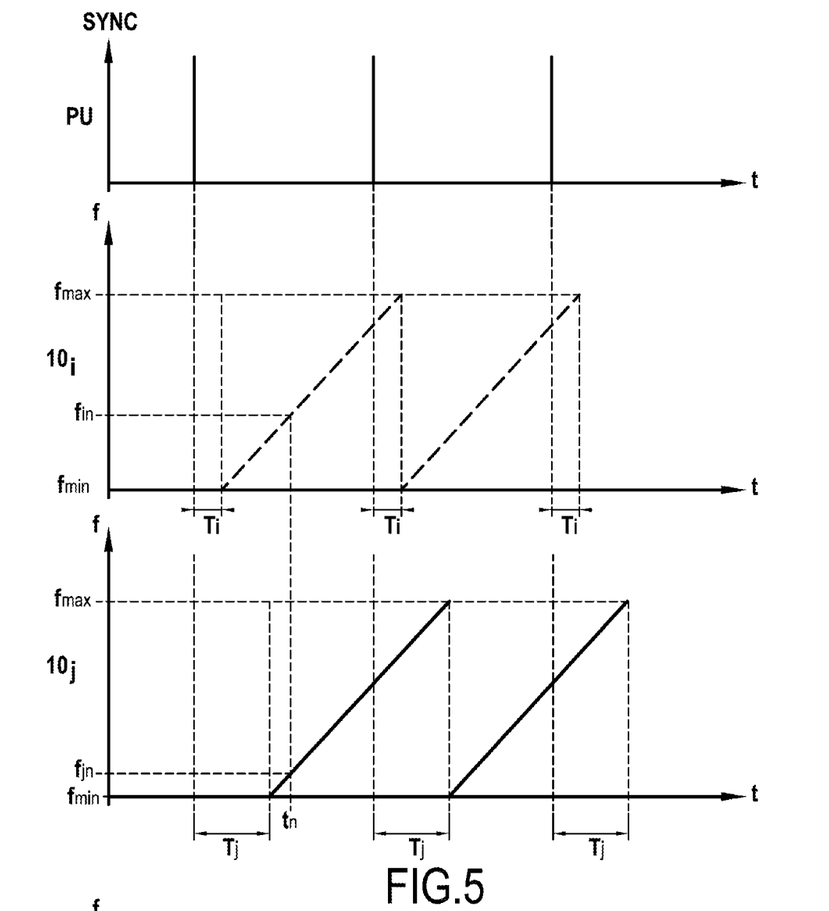
FIG. 5 illustrates the synchronization used in a particular embodiment of the disclosure.

In the implementation described here, the signal generator 210 of said FMCW radar sensor generates a FMCW signal according to a saw tooth waveform as shown in FIG. 5. The upsweep is linear and the power amplifier is shut down during downsweep so that no signal is transmitted by antennae 230. The power amplifier stays shut down until a new transmission step starts.

Figure 6:
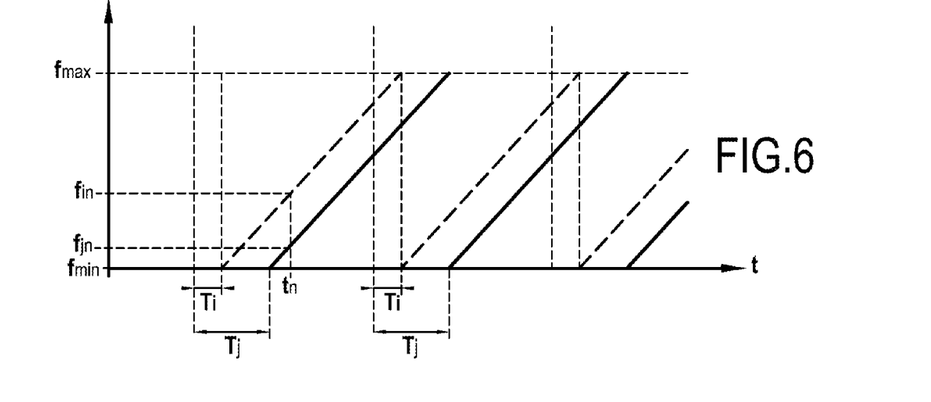
FIG. 6 illustrates the non-perturbing operation of two FMCW radar sensor units.

In the embodiment of FIG. 6, since each FMCW radar sensor operates in the entirety of the frequency band, in order to achieve optimal range resolution, their signals totally overlap. The time shift between two FMCW radar sensor 10i and 10j signals is a multiple of ΔT and is equal to ΔT*(i−j) in the implementation described here. As a consequence, given the saw tooth waveform, the frequency shift is:

$$\Delta F = \Delta T*(i-j)*B/\text{Tramp}. \text{ Where:}$$

B is the waveform bandwidth, covering the entirety of the system frequency band starting at $f_{min}$ and ending at $f_{max}$.
Tramp is the duration of a upsweep ramp of the sawtooth,
ΔF is the frequency shift and
ΔT is said delay unit supplied by the central unit.

The minimal frequency shift between two FMCW radar sensors is equal to ΔF=ΔT*B/Tramp.

ΔT delay unit is determined so that said minimal frequency shift:

ΔF>>Fc, where Fc is the cutoff frequency of the receive channels 211, 212, 213.

This design relationship is completed by
the logic 300 of the central unit, allowing to generate a pulse on the synchronization signal SYNC,
the SYNCi link within the central unit and each radar sensor 10i, allowing to send the synchronization signal simultaneously to each FMCW radar sensor,
the unique broaching of the sheath termination connector of each radar sensor 10i, allowing to identify its unique index and
the logic 200 of each radar sensor 10i, allowing to determine a delay Ti for starting transmitting its FMCW signal after reception of the SYNC signal,
all contribute to guarantee that all FMCW radar sensors of the system can operate in the entirety of the said frequency band, i.e. achieving optimal range resolution, without perturbing each other.

In the implementation described here, the transmission means transmit a signal at the carrier frequency of 10 GHz. For a bandwidth of a few tens of MHz, a Tramp of a few hundreds of Δs, and a cutoff frequency of a few hundreds of kHz, that allow to protect an airborne platform against collision, it is possible to have 10 sensors to operate simultaneously.

An alternative implementation can use electromagnetic wave in the frequency range of [5 GHz; 18 GHz].

Figure 3:
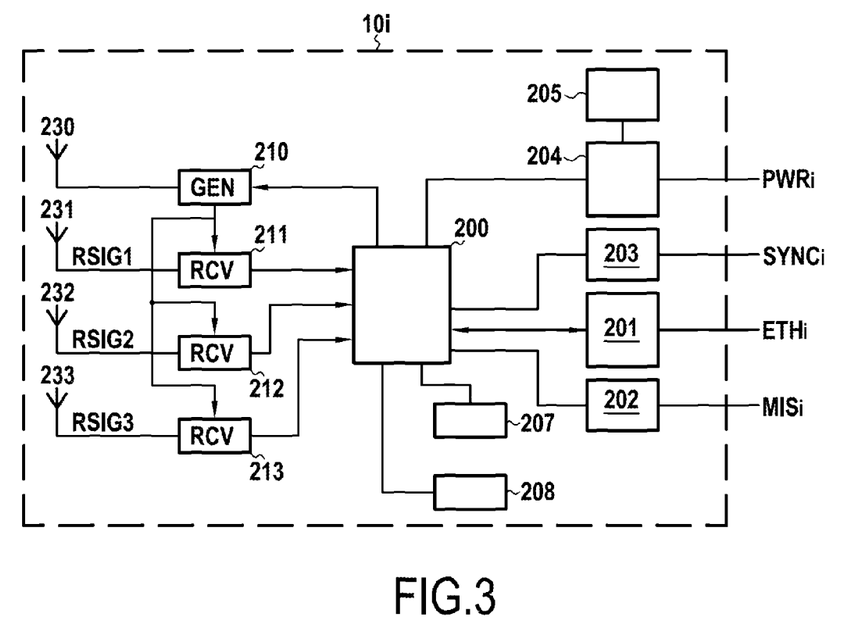
FIG. 3 represents a block diagram of a sensor unit of the protecting system of FIG. 2.

With reference to FIG. 3, each FMCW radar sensor 10i comprises transmission means able to transmit an electromagnetic wave in the whole area of interest, the area of interest being the area in which one wants to detect obstacles.

In the described mode of implementation, these transmission means comprise an electromagnetic wave generator and amplifier 210 and a transmission antenna 230.

In the implementation described here, the transmission antenna 230 illuminates an angular volume of 90° in horizontal and 90° in vertical with its principal lobe.

In the implementation described here, the amplifier of a given FMCW radar sensor can be deactivated upon request from the central unit 110.

To achieve this, the central unit 110 sends a "RF OFF" command to the radar sensor 10i using its above mentioned dedicated ETHi link.

This command is interpreted by a logic control 200 of the sensor unit that in turn activates a signal towards generator 210 in order to shut down its antenna power amplifier. In order to resume 10i operation, a "RF ON" command is issued by the central unit 110 towards 10i, on its dedicated ETHi link.

In the implementation described here, each FMCW radar sensor comprises 3 receive antennas, 231, 232, 233 capable of receiving in step S60 the analog signals echoing from the whole area of interest.

In the implementation described here, the transmission 230 and receive 231, 232, 233 antennae are patch antennae which are implemented on a 2 by 2 matrix, as the four corners of a square. The side of the square is half the wavelength so that elevation and azimuth can be computed according to step P50 described in detail below without any angular ambiguity.

Each antenna, receive and transmit, covers an angular volume of 90° in horizontal and 90° in vertical with its principal lobe.

Each analogue signal RSIGi received at step S60 at the output of each receive antenna 231, 232, 233 is provided in step S70 as input to a receiving channel 211 including:
an homodyne receiver, known by the man skilled in the art, for demodulation and low pass filtering, and
an analog to digital converter for conversion into a digital signal called raw data (digitizing).

In the implementation described here, logic control 200 arranges the raw data into 1500 bytes long frames, according to the following organization:
FMCW Sensor Radar status
FMCW ramp number
Raw data from receiving antenna #1
Raw data from receiving antenna #2
Raw data from receiving antenna #3
Provision space The Ethernet interface 201 then transmits those frames at a step S80 through the above-mentioned Ethernet link using a MAC controller and a PHY interface of type 100 BASE-TX, with 2 copper pairs. Only this part of the Ethernet protocol is implemented, and no AFT (Address Forwarding Table) is used. The frames are received by the central unit 110 on a dedicated Ethernet interface 31i.

In this implementation, all FMCW radar sensors use the same address, since each central unit 110 to sensor unit 10i link is an independent Ethernet network by itself.

In the implementation described here, the Ethernet frame containing the raw data coming from the 3 antennae and sampled during one FMCW ramp, is transmitted in less than 150 microseconds which is less than the FMCW ramp duration. This allows each radar sensor 10i to transmit raw data from one ramp while sampling raw data from the next ramp.

Figure 4B:
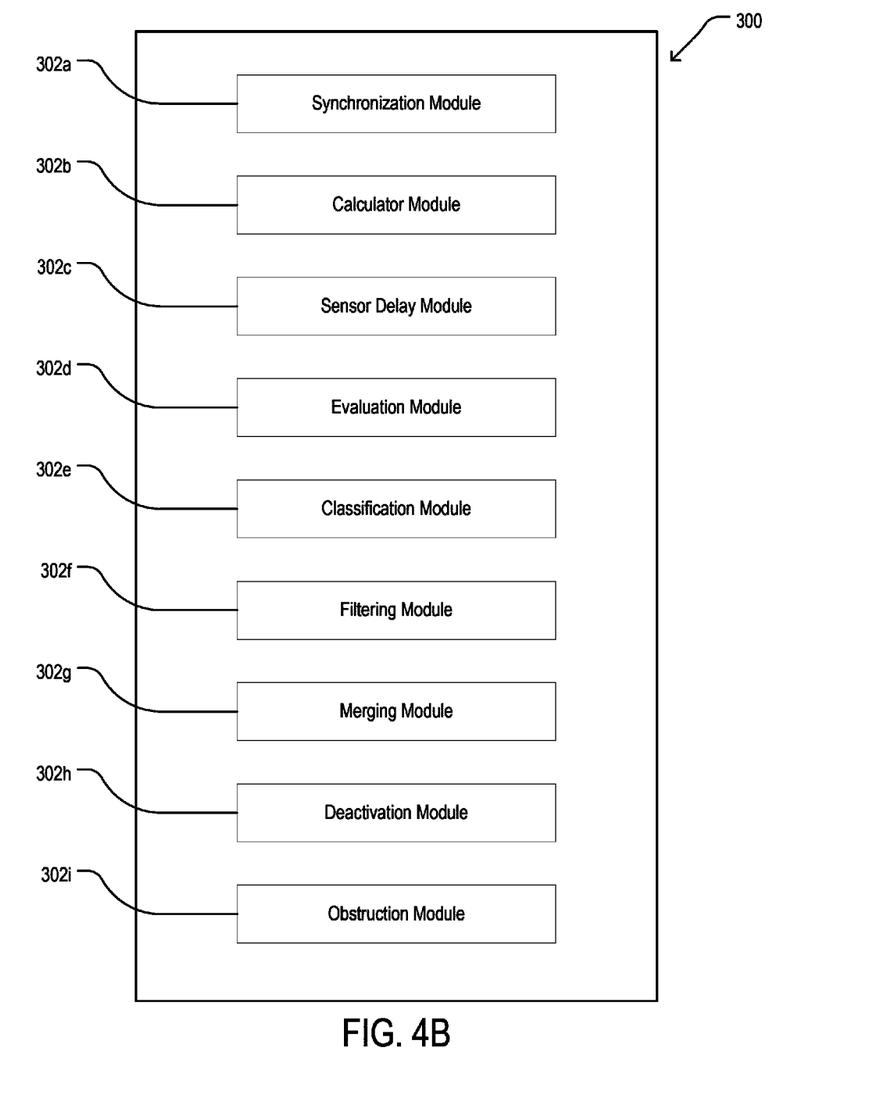
FIG. 4B represents a block diagram of the logic of FIG. 4A.

With reference to FIG. 4A, in the implementation described here, the central unit 110 receives raw data from each FMCW radar sensor through ETHi link connected to a dedicated interface 31i composed of a PHY transceiver and MAC controller, and a control logic 300 stores the corresponding raw data into a volatile memory 308. With reference to FIG. 4B, the control logic 300 can include a synchronization module 302a, a calculator module 302b, a sensor delay module 302c, an evaluation module 302d, a classification module 302e, a filtering module 302f, a merging module 302g, a deactivation module 302h, and an obstruction module 302i.

The PHY transceiver and MAC controller for each ETHi link constitute the receiving means for receiving via each dedicated point to point link, raw data sent by each FMCW radar sensor.

In this implementation, the FMCW raw data samples are stored first in function of the FMCW ramp they belong to, then in function of their FMCW radar sensor 10i, then in function of their receiving antenna, and then in function of the sample index within the FMCW ramp.

In terms of physical memory address, this corresponds to the concatenation of the FMCW ramp number, the FMCW Radar sensor unique index, the receiving antenna number, and the index of the sample within the FMCW ramp.

According to some exemplary embodiments of the disclosure, the central unit 110 applies a range and Doppler filtering at step P30 on the time domain data extracted from each Ethernet link ETHi. At the output of step P30, data are then in the 2D—frequency domain, axes of which correspond to range and radial velocity.

In the implementation described here, this filtering is performed thanks to two consecutive Fast Fourier Transforms (FFT), a technique known by the man skilled in the art.

In a preferred embodiment, we also apply a weighting window to reduce masking of small obstacles by reflections from large objects. The window coefficients are applied:

firstly by complex multiplication on the time domain data, preliminary to the range FFT secondly by complex multiplication on the range domain data, preliminary to the second FFT.

At step P40, the central unit 100 performs potential obstacles detection using, in the implementation mode described here, a Constant False Alarm Rate detector (CFAR). This general technique being well known by the man skilled in the art consists of applying a threshold in amplitude to the data in the range and radial velocity domain for each of the receive channels. The threshold value is adjusted depending on the noise level.

In a preferred embodiment, the adaptive threshold is estimated taking into account the velocity and the altitude of the airborne platform. For example:

The threshold level may be increased if the airborne platform altitude is increased. Rationale is that at higher altitude, hazardous obstacles are also higher, hence are easier to discriminate from ground clutter;

The threshold level is decreased when the velocity is increased. Rationale is that at higher velocity, and in order to provide sufficient warning time, only a little time is authorized to miss detection. Therefore, detection probability may be favored with respect to false alarm probability.

The range and Doppler FFT and their associated windows, as well as the CFAR algorithm with its adaptive threshold, are executed in steps P30 and P40 by the logic 300 and its volatile memory 308. Those algorithms and this hardware constitute processing means to detect obstacles in the field of view of FMCW radar sensors.

At step P50, the central unit 110 executes an azimuth and elevation extraction. In the implementation described here, the detection step P40 provides three inputs to this step, one per receive channel, from which horizontal and vertical angles of obstacles are calculated by phase monopulse principle, as known by the man skilled in the art.

In another possible embodiment of the disclosure, these horizontal and vertical angles of the obstacles are calculated by amplitude monopulse principle, as known by the man skilled in the art.

In the implementation described here, at step P60, the central unit 110 groups together elementary detections according to a nearest neighbor criterion to form clusters that are characterized by a list of attributes.

In the implementation described here, this list of attributes comprises the mean value and the standard deviation of distance range, radial velocity, elevation range and azimuth range of the obstacle.

In the implementation described here, at step P70, the central unit 110 creates a list of tracks TRAi for each sensor unit 10i, by evaluating the coherence in time of the displacement of the cluster compared to their list of attributes. The elementary steps of this tracking procedure are known by a man skilled in the art and typically involve:

Evaluating the correlation between received clusters and previously existing tracks Assigning clusters and corresponding tracks based on a nearest neighbor criteria Updating tracks parameters with the attributes of the assigned cluster Creating new tracks when no existing track can be assigned to a cluster Deleting tracks when no cluster can be assigned to it.

In the implementation described here, the central unit 110 merges in step P80 the tracks that are received from the FMCW radar sensors into a single detected obstacles list according to a nearest neighbor criterion.

In a preferred embodiment, this nearest neighbor criterion is applied in the three dimensions of a Cartesian referential.

The azimuth and elevation extraction, as well as the clustering, tracking and merging algorithms, are executed in steps P50 and P60 by the logic 300 and its volatile memory 308. Those algorithms and this hardware may constitute the calculating means for calculating parameters for each detected obstacle, parameters including, in this implementation, mean value and the standard deviation of distance range, radial velocity, elevation range and azimuth range of the obstacles.

In the implementation described here, at step P85, the central unit 110 computes geographical proximity and time to impact from the obstacles list and their attributes and especially from their range and radial velocity to evaluate dangerousness of obstacles.

The detected obstacles are then classified (step E85) into user defined category according to their dangerousness based on user defined threshold. The current implementation uses a test based on the range criterion only, and:

close obstacles are classified as hazardous and an alarm is issued intermediate distance obstacles are classified as potentially hazardous and a warning is issued long distance obstacles are classified as indicative and no signal is reported to the platform crew.

The classification means to classify detected obstacles according to their previously evaluated dangerousness are constituted by said test and the logic 300 and its volatile memory 308.

At step P90, the central unit 110 generates and transmits to the Avionics System data representing detected obstacles and their parameters. That data can either be alarms towards the HMI 109, or radar designations towards an IMA 112.

In some embodiments, the central unit transmits to the HMI 109, through the interface 351, alarms issued by classification means and their parameters comprising radial velocity, distance range, azimuth range and dangerousness level of each detected obstacle classified as "alarm" or "warning", via the RS422 serial link, such that it can be represented accordingly on a display. The central unit also sends data representing a "alarm sound" or "warning sound" command via two discrete links going towards said HMI, in order that said HMI generates the appropriate sound in the pilot's headset.

The RS422 serial link and the discrete audio links constitute the transmitting means to transmit the avionic system (109, 112) of the airborne platform (111) data representing detected obstacles and their parameters.

In an alternate implementation, the central unit transmits through interface 352 radar designations and their parameters towards the airborne platform's IMA 112, over a high-speed ARINC 429 link. Radar designations are data representing the detected obstacles before dangerousness filtering is applied, so that said IMA has to perform its own evaluation and classification of dangerousness in order to generate the appropriate visual and sound alerts.

In this alternate implementation, radar designations and their parameters transmitted to the IMA 112 for each detected obstacle are:

Radial velocity

Distance range

Azimuth range

Elevation range

FMCW Radar Sensor index

Obstacle Signal to Noise Ratio.

This allows the transmission of up to 40 radar designations towards the IMA over the ARINC 429 link, with sufficient amount of spare bits for future evolutions.

In the implementation described here, the central unit 110 filters out the echoes that are reflected by the envelope of the platform according to their range and radial velocity attributes. In a step P30, the range and Doppler filtering is then performed by applying masks in the range and radial velocity domain that prevents detections from these parts of the envelope.

Those masks are specific to each airborne platform, and are stored in the nonvolatile memory 308 of the central unit 110.

As an example, if a sensor has part of the airborne platform in its Field Of View, then the corresponding mask will filter out all detections appearing within the range of this part.

In another embodiment of the disclosure, this filtering is applied at the tracking step P70 by not issuing the tracks that correspond to the platform elements location that is defined in the configuration parameters.

In the implementation described here, the central unit 110 detects the possible obstruction of one of the FMCW sensors by monitoring in the tracking step P70 the energy level of the very first echo along the range dimension and at zero radial velocity. This echo indeed corresponds to the antenna radome reflection and is at a constant energy level when operating in nominal conditions. Whenever an obscurant is present on top of the radome, the level of this reflection changes.

Back to FIG. 3, in this implementation, each radar sensor 10*i* receives its power from the central unit 110, through its interface 204.

In the implementation described here, each FMCW Radar sensor 10*i* switches off its power unit 204 as soon as its internal temperature goes above +85° C., such that all the electronic components, except a temperature switch 205, can be chosen among standard industrial grade components in order to reduce the recurring cost of the solution.

Once the internal temperature goes below +80° C., the temperature switch 205 restores the power to the rest of the electronic components, and the FMCW Radar sensor becomes operational again. The hysteresis on temperature stabilizes the system in the sense that the FMCW Radar sensor doesn't stop and restart ceaselessly around the threshold temperature.

In the description above, only one central unit 110 was disclosed. In another embodiment, at least two central units could be used, each central unit is connected to its own sensors, allowing a higher number of sensors overall. The sensors are exactly the same as for the preferred implementation.

One of the units is configured as "Master", and the other as "Slave". The Slave unit receives the SYNC signal from the Master unit and routes this signal towards its own sensor units. The Master unit receives data from the Slave unit via an Ethernet link.

In the alternate implementation described here, each FMCW radar sensor determines at step S10, a unique index number in the same way as described above for the preferred implementation, except that the mating connector broaching will be chosen such that the index number will be unique within the whole system, no matter which processing unit the sensor is connected to.

When the Master central unit generates a synchronization pulse on the SYNC signal (step P10), this pulse is then received at the same time by each sensor within the system, no matter which processing unit it is connected to.

This allows both central units to send the same, synchronized pulse to all the sensors, so that they can all operate together, in the entirety of their frequency band, without being perturbed by their neighboring FMCW radar sensors.

Each processing unit then calculates the parameters of each detected obstacle. The slave unit transmits the obstacle data towards the master unit through the Ethernet link described above. The master unit then merges the obstacles obtained from all the sensors in the system, and transmits the resulting data representing detected obstacles and their parameters, to the airborne platform's avionic system.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A protecting system for protecting an airborne platform against collisions with obstacles, said system comprising:
    at least one central unit;
    at least two identical FMCW radar sensors on the surface of said airborne platform and designed to operate in the entirety of a same frequency band, the frequency band starting at a minimum frequency and ending at a maximum frequency, each said FMCW radar sensor being connected to said central unit via a first dedicated point to point link, and comprising:
        at least one transmitting antenna for transmitting a FMCW signal;
        at least two receiving channels, each channel comprising a receiving antenna for generating a received signal from the echoes reflected by at least one of said obstacles, and means for demodulating, filtering and digitizing said received signal into a digital signal, said receiving antennae being arranged to allow measurement of at least an azimuth of said at least one obstacle; and
        a first interface configured to send said central unit data representing said digital signals via said first dedicated point to point link;
    said at least one central unit comprising:
        a second interface configured to receive, via each said first dedicated point to point link, said data sent by each said FMCW radar sensor;
        a processor configured to process said data to detect said obstacles in a field of view of said FMCW radar sensors;
        a calculator module configured to calculate parameters for each said detected obstacle, said parameters comprising at least a radial velocity, a distance range and an azimuth range of said obstacle; and
        a generator and transmitter module configured to generate and transmit to an avionic system of said airborne platform data representing said detected obstacles and their said parameters; and
        a synchronization module configured to shift said FMCW signals emitted by said transmitting antennae in time to create a shift in frequency such that each FMCW radar sensor generates a signal in the entirety of said frequency band, the signal starting at the minimum frequency and ending at the maximum frequency, without being perturbed by said neighboring FMCW radar sensors.

2. A protecting system according to claim 1, wherein said synchronization module comprises:
    a third interface of said central unit configured to simultaneously send a synchronization signal to each of said FMCW radar sensors; and
    a sensor delay module of said FMCW radar sensors configured to determine a delay to wait before starting transmitting said FMCW signal after reception of said synchronizing signal.

3. A protecting system according to claim 2, comprising:
    one central unit configured as a master central unit and at least one central unit configured as a slave central unit, each central unit being connected to corresponding FMCW radar sensors;
    said at least one slave central unit configured to receive said synchronization signal from said master central unit and to route said synchronization signal towards said corresponding FMCW radar sensors;
    each said central unit including a processing unit configured to calculate said parameters of each detected obstacles;
    said at least one said central unit configured to transmit said parameters towards said master central unit;
    said master central unit configured to merge said obstacles and to transmit the resulting data representing said obstacles and their parameters to said avionic system.

4. A protecting system according to claim 1, wherein said central unit is configured to send said synchronization signal to said FMCW radar sensors via a second point to point dedicated link different from said first dedicated point to point link, each said second point to point dedicated link being a differential line.

5. A protecting system according to claim 1, further comprising:
    an evaluation module configured to evaluate a dangerousness of said detected obstacles from said parameters; and
    a classification module configured to classify said detected obstacles according to their dangerousness.

6. A protecting system according to claim 1, wherein said first dedicated point to point link is an Ethernet full duplex link, said data being encapsulated into Ethernet frames.

7. A protecting system according to claim 1, wherein said at least one central unit further comprises a filtering module configured to filter said received signals due to echoes reflected by the envelope of said airborne platform according to at least one of said parameters of said envelope.

8. A protecting system according to claim 1, wherein said receiving antennae are arranged in said sensor unit to further allow the measurement of the elevation of said at least one obstacle, said parameters of each said detected obstacle also comprising its elevation.

9. A protecting system according to claim 1, wherein said at least one central unit further comprises a merging module configured to merge said obstacles detected by at least two said different FMCW radar sensors.

10. A protecting system according to claim 1, wherein at least one of said FMCW radar sensors further comprises a deactivation module configured to deactivate the at least one FMCW radar sensor if the temperature inside that sensor is higher than a determined threshold.

11. A protecting system according to claim 1, wherein said processor detects said obstacles based on at least one flight parameter of the airborne platform.

12. A protecting system according to claim 1, further comprising an obstruction module configured to detect that at least one of said FMCW radar sensor is obstructed.

13. A protecting system according to claim 1, wherein at least one said FMCW radar sensor is powered from said central unit.

14. A protecting system according to claim 1, wherein said central unit comprises a third interface configured to send at least one of said FMCW radar sensor a command to deactivate the transmitting radio components of said sensor.

15. A protecting system according to claim 1, wherein said antennae are patch antennae.

\* \* \* \* \*